United States Patent [19]

Williams

[11] 4,260,891

[45] Apr. 7, 1981

[54] RADIATION DETECTORS

[75] Inventor: Anthony M. Williams, Iver, England

[73] Assignee: EMI Limited, Hayes, England

[21] Appl. No.: 62,328

[22] Filed: Jul. 31, 1979

[30] Foreign Application Priority Data

Aug. 4, 1978 [GB] United Kingdom ............... 32323/78

[51] Int. Cl.[3] ......................... G01T 1/18; G01N 21/00

[52] U.S. Cl. ................................. 250/385; 250/445 T

[58] Field of Search ................ 250/363 R, 363 S, 366, 250/385, 445 T

[56] References Cited

U.S. PATENT DOCUMENTS

| | | | |
|---|---|---|---|
| 3,778,614 | 12/1973 | Hounsfield | 250/362 |
| 3,924,129 | 12/1975 | LeMay | 250/336 |
| 4,031,396 | 6/1977 | Whetten et al. | 250/385 |
| 4,119,853 | 10/1978 | Shelley et al. | 250/385 |

*Primary Examiner*—Alfred E. Smith

*Assistant Examiner*—Janice A. Howell

*Attorney, Agent, or Firm*—Cooper, Dunham, Clark, Griffin & Moran

[57] ABSTRACT

In gas detectors, such as may be used in computerized tomographic (CT) apparatus, it is necessary to provide electrical connections into the pressure vessel. Conventionally, these are by ceramic lead-throughs or similar. As gas detectors require an increasing number of individual detector elements, and therefore internal electrodes, the number of connections required increases and they are more closely spaced. This large number of connections can affect the integrity of the pressure vessel. This invention places a circuit board as a gasket between two parts of the pressure vessel, such as between a chamber and lid, so that conducting tracks on or in the circuit board provide the required connections. The invention is suitable for lead through for pressure vessels other than gas detectors of radiation.

11 Claims, 4 Drawing Figures

RADIATION DETECTORS

The present invention relates to detectors of penetrating radiation, in particular detectors of X-radiation for use with computerised tomographic (CT) apparatus.

U.S. Pat. No. 3,778,614 describes there is described examples of such CT apparatus for examining a planar slice of the body of a patient. The apparatus includes a source of penetrating radiation and detector means responsive to the radiation. The source and detector means are scanned, in the slice and relative to the body, so that the detector means provides output signals which can be processed to give a representation of the distribution of attenuation of the radiation with position in the slice. The Patent describes a suitable method for processing the signals and an improved form of that processing is described in U.S. Pat. No. 3,924,129.

The scanning may be achieved by a source and detector means which are reciprocated in the plane of the slice and orbited about an axis perpendicular to that plane. This method is, however, relatively slow. A potentially faster method uses an apparatus in which the source provides a fan-shaped distribution of radiation of sufficient extent to include the whole of the region of interest, in the body, in the plane. The detector means is capable of providing a plurality of output signals at different positions across the plane, and representing radiation received along different paths in the distribution, and a complete scan can then be effected solely by orbiting the source and detectors about the axis. Other scanning movements can be superimposed to achieve particular effects and a large detector means, which does not move, can be substituted.

The detector means required for such apparatus includes a large number of individual detector devices, each receiving radiation along a different beam path in the fan distribution. The detectors may take many different forms such as scintillator crystals co-operating with light detectors. One form which has been suggested is that of a gas detector filled with a pressurised gas, such as Xenon, with pluralities of positive and negative electrodes such that each pair of a positive and negative electrode forms an individual detector element. Proposals for such detectors include that described in U.S. Pat. No. 4,031,396.

Each such electrode requires a "lead-through" in the pressure vessel wall to form an electrical connection to external power supplies and for the detector signal. Conventionally, such lead-throughs are made through ceramic or other insulated terminals which are pushed through small holes in the pressure vessel and fixed, typically by soldering. However, with the detector arrangements, used in CT apparatus, referring to hereinbefore, an increasing number of detector elements at progressively finer pitches is resulting in a large number of small holes in the pressure vessel for lead throughs. These present problems in maintaining the integrity of the pressure vessel against increasing stress levels and also provide many potential leak paths.

It is an object of this invention to provide a detector means having an alternative lead-through arrangement.

According to a first aspect of the invention there is provided a pressure vessel including a connection means which comprises a circuit board, having conducting tracks, mounted in an aperture in the pressure vessel such that the conducting tracks form electrical connections between the inside and the outside thereof.

According to another aspect of the invention there is provided a detector of penetrating radiation including, a pressure vessel to be filled with a high pressure gas for ionisation by incident radiation, a plurality of electrodes disposed in the pressure vessel to form individual detector elements, and connection means making electrical connection from outside the pressure vessel to said electrodes, the connection means comprising a laminated circuit board, having conducting tracks formed between at least two layers thereof mounted in an aperture in the pressure vessel; such that conducting tracks form electrical connections between the inside and outside of said vessel.

In order that the invention may be clearly understood and readily carried into effect, an example thereof will now be described with reference to the accompanying drawings, of which:

Figure 1:
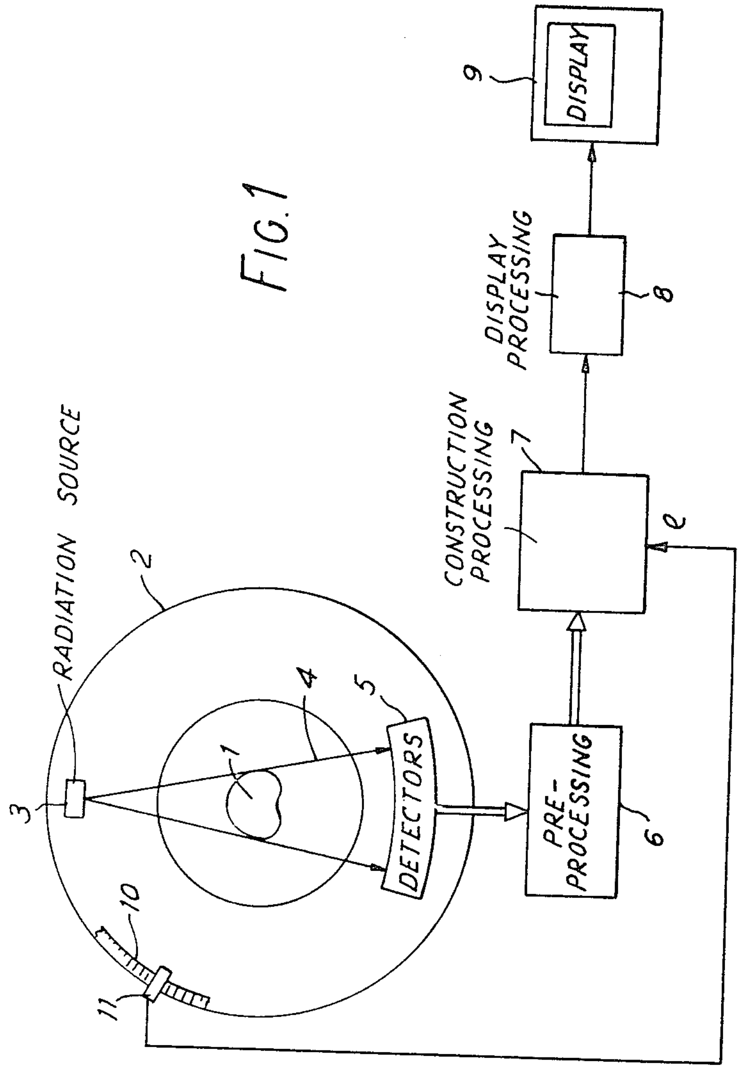
FIG. 1 shows a CT apparatus with which the invention may be used.

FIG. 1 shows one example of a CT apparatus with which this invention can be used. Data relating to the attenuation of radiation in a body 1, are obtained in a scanning apparatus indicated generally at 2. This scanning part includes a radiation source 3, directing a fan distribution of radiation 4 through a body 1, and detectors 5 receiving the radiation. The data are pre-processed by circuit 6, in which they are, for example, converted to logarithmic and digital form, to take the form of measurements of attenuation of the radiation for the paths along which it has passed through the body. The data signals representing these measurements are then processed in circuits 7 to provide the desired reconstruction of the distribution of attenuation in the examined slice. The processed data, which now represent attenuation values for elements of a matrix of elements defined in the slice are further subjected to display processing in circuits 8 to be provided in a form compatible with a chosen display unit 9. Circuits 9 require information indicative of the progress of the rotational scan. For this reason the apparatus includes a graticule (shown in part at 10) which co-operates with a photocell unit 11 to provide the processing 7 with signals indicative of the orbital progress. The processing can be based on a convolution procedure as described in said U.S. Pat. No. 3,924,129.

This invention is concerned with an arrangement in which detectors 5 comprise individual detector elements formed by anode and cathode electrodes within a gas filled pressure vessel. It is proposed to construct the pressure vessel in two parts, which are bolted or otherwise fixed together in assembly, with a circuit board or known type sandwiched in the manner of a sealing gasket between the two. The two parts are conveniently a part of the pressure vessel and an X-Ray window part and the circuit board may be a multilayer board with tracks forming electrical connections between layers.

Figure 2:
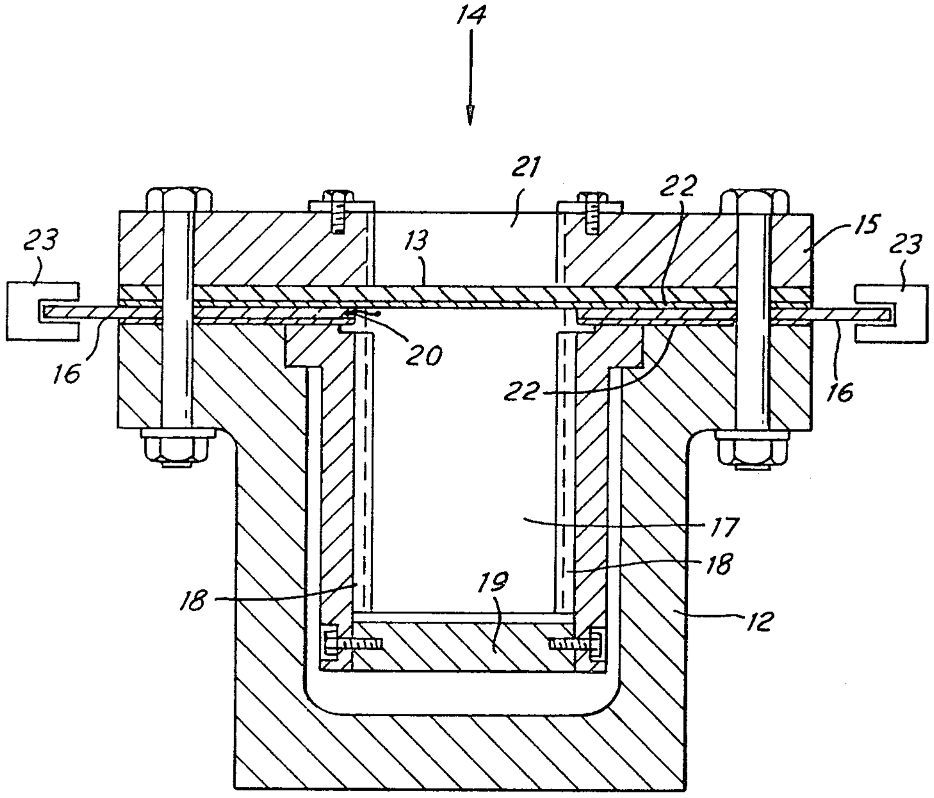
FIG. 2 shows in section a detector box including the invention.

FIG. 2 shows a section through a typical detector box. The pressure vessel 12 is a channel section casing of, typically, wrought aluminium alloy. An X-ray window 13, of Carbon fibre is placed on the top to admit X-rays 14 and held down by a clamping lid 15 of the same material as casing 12. A circuit board 16, having tracks as explained hereinbefore, is sandwiched in the manner of a gasket between the casing 12 and window 13. The detector arrangement includes ceramic separator plates 17 with metalised surfaces which can act as electrodes. Connections to the plates 17 are then made by leads from the circuit board tracks. The leads are shown at 20 as soldered wire but may take other forms.

Collimators 21 are also provided to confine the X-rays incident on each detector element, between two plates 17, to beams transmitted substantially along direct paths and to exclude in part scattered radiation. Sealing gaskets 22, made of PTFE, or similar, are provided each side of circuit board 16. A seal can also be made using Indium wire or 'O' rings. External connections to board 16 are by standard circuit board connectors 23.

Figure 3:
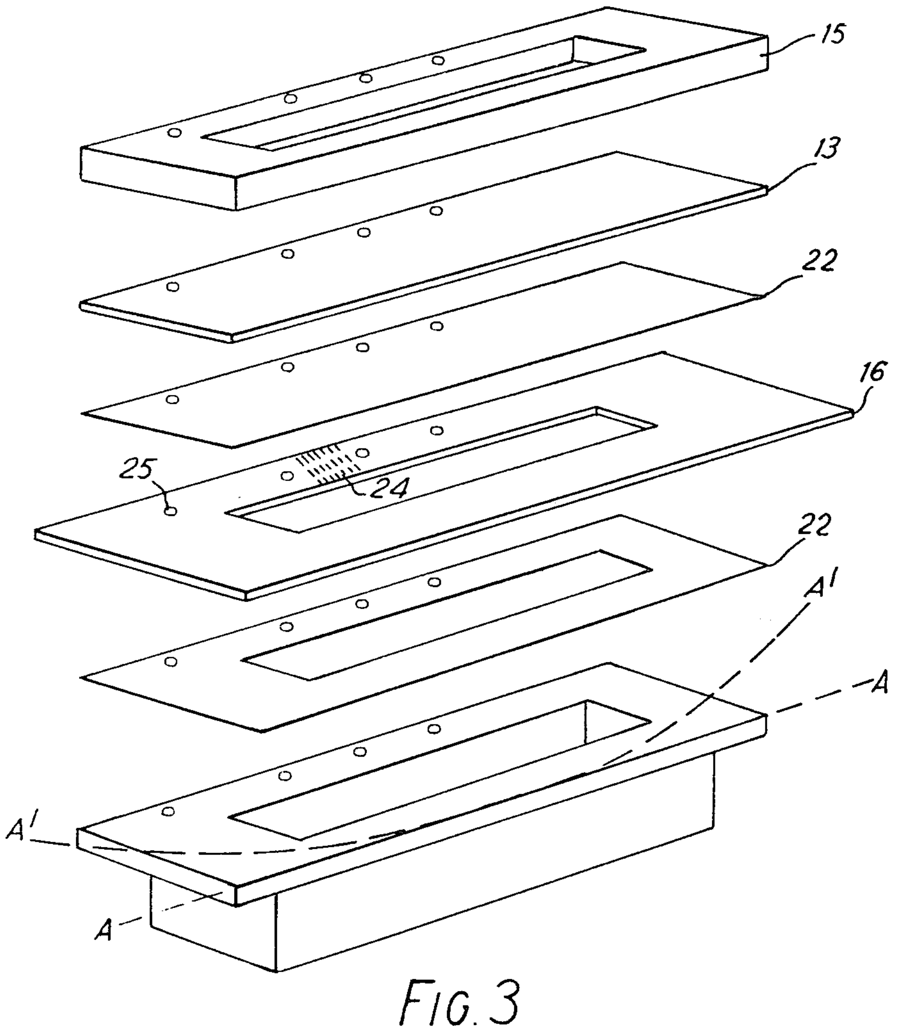
FIG. 3 shows an exploded view of the detector box of FIG. 2.
Figure 4:
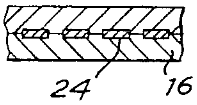
FIG. 4 shows a cross-sectional view of a suitable circuit board.

FIG. 3 shows an exploded view of the same detector box to show how the components holding the circuit board are assembled and does not therefore show the collimators, plates 17 or their mounting assembly. There are also shown at 24 a limited number of circuit board tracks, between bolt holes 25, of which only four are shown. A small part of the circuit board and tracks is also shown in Section in FIG. 4 in which the tracks are sandwiched between two laminae of a laminated board.

Although FIG. 3 shows the surface of the detector box being flat, as AA, it should be noted that it could be curved as AA", perhaps to lie on a circle about the X-ray source as in the apparatus shown in FIG. 1. It will also be appreciated that, although a particular design of detector box, using stated materials, has been shown, the box may take any other suitable form and still include the circuit board connections as provided by this invention. The pressure vessel and lid need not be totally independent but may be formed in a single piece provided the window, circuit board and gaskets can be introduced into a suitable position.

Although the invention has been described primarily for providing electrical connections into a gas filled radiation detector, it will be realised that it is useful for other applications. In general it may be used to provide electrical connections into a pressure vessel where a pressure vessel is designed to retain a pressure differential across its walls due to either raised or lowered pressure inside or outside the vessel.

What I claim is:

1. A pressure vessel having an aperture therein and including a connection means which comprises a circuit board, having conducting tracks, mounted in the aperture such that the conducting tracks form electrical connections between the inside and the outside of the pressure vessel.

2. A pressure vessel according to claim 1, comprising at least first and second parts, in which said circuit board is sandwiched between the first and second parts.

3. A pressure vessel according to claim 2 in which the first part comprises a casing member, having components within to which the electrical connections are made, and the second part comprises a lid member closing the casing.

4. A pressure vessel according to claim 2 including one or more sealing gaskets disposed between said parts and said circuit board to prevent leakage along the boundary therebetween.

5. A pressure vessel according to any of the preceding claims in which the circuit board is formed with conducting tracks formed between at least two adjacent layers.

6. A detector of penetrating radiation including a pressure vessel having at least one aperture therein, the pressure vessel to be filled with high pressure gas for ionisation by incident radiation, a plurality of electrodes disposed in the pressure vessel to form individual detector elements and a circuit board, having conducting tracks, mounted in the aperture so that the conducting tracks form electrical connections from the electrodes to the outside of the pressure vessel.

7. A detector according to claim 6 including a radiation transmissive window also mounted in said pressure vessel.

8. A detector of penetrating radiation including, a pressure vessel to be filled with a high pressure gas for ionisation by incident radiation, a plurality of electrodes disposed in the pressure vessel to form individual detector elements, and connection means making electrical connection from outside the pressure vessel to said electrodes, the connection comprising a laminated circuit board, having conducting tracks, formed between at least two layers thereof, there being also an aperture in the pressure vessel with the circuit board mounted therein such that conducting tracks form electrical connections between the inside and outside of said vessel.

9. A detector according to claim 8 in which the pressure vessel comprises at least first and second parts and said circuit board is sandwiched between said first and second parts.

10. A detector according to claim 9 in which the first part is a casing member enclosing said electrodes and the second part is a lid member closing said casing.

11. A detector of penetrating radiation comprising a pressure vessel enclosing a plurality of electrode plates defining detector cells, said vessel containing a detector gas under pressure and comprising a casing and a lid secured together to enclose said electrodes and contain said detector gas, said detector further comprising a laminated circuit board mounted and secured as a gasket between the casing and lid and having electrically conductive tracks which are between laminae of the board and make electrical connection between the outside of the pressure vessel and the electrode plates inside the vessel.

* * * * *